Dec. 23, 1924.  
F. BLUMENTHAL  
1,520,399  
APPARATUS FOR PURIFYING BOILER FEED WATER  
Filed July 15, 1924
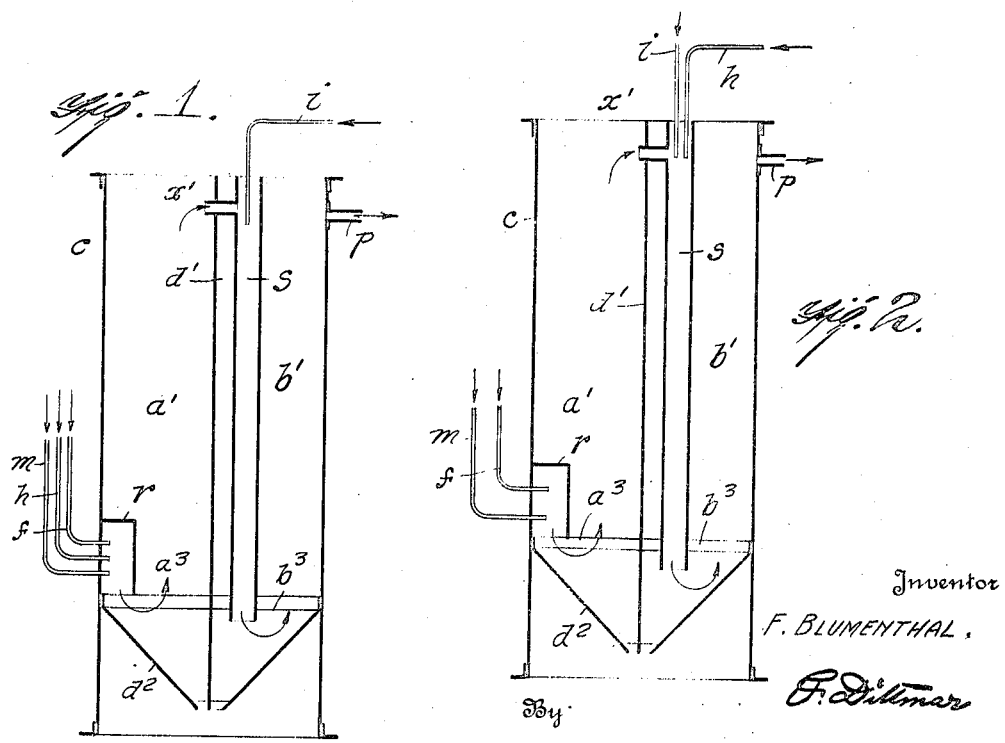
Inventor  
F. BLUMENTHAL.  
By  
Attorney Patented Dec. 23, 1924.

1,520,399

UNITED STATES PATENT OFFICE.

FERDINAND BLUMENTHAL, OF COLOGNE-BRAUNSFELD, GERMANY.

APPARATUS FOR PURIFYING BOILER FEED WATER.

Application filed July 15, 1924. Serial No. 726,229.

*To all whom it may concern:*

Be it known that I, FERDINAND BLUMENTHAL, a citizen of the German Republic, and resident of Cologne-Braunsfeld, Germany, have invented a new and useful Apparatus for Purifying Boiler Feed Water, of which the following is a specification.

To purify boiler feed-water by mixing the raw water outside the boiler with certain chemicals, as well as with alkaline water, is well-known. The alkalinity of this water due to the presence of soda and caustic soda varies considerably as regards its concentration, as well as its composition. The object of my invention is to remedy this, and I attain that object by conducting the treatment of the raw feed-water according to the results of tests made with this water after one or more chemicals has been added, but prior to the admixture of the alkaline water, of which equal amounts are admixed in equal periods of time.

If the raw feed-water is mixed with the chemicals and the alkaline water in only one receptacle, there is provided in this latter a space or chamber in which the feed-water provided with one or more chemicals can be tested as to the effect of these latter; the place where the chemicals are added is separated from the place where the alkaline water is admixed. This arrangement and procedure renders it possible to conduct the purifying process in correspondence with the variations of the percentage of alkali in the alkaline water, as is more fully described hereinafter.

My invention is carried into practice by means of my purifying apparatus as illustrated diagrammatically and by way of example in the accompanying drawing, in which—

Figure 1 is a vertical section, and

Figure 2 a similar view showing a modification.

It is assumed that the admixture of the chemicals and of the alkaline water to the raw boiler feed-water is effected in one receptacle, and it is further assumed that common soda and caustic soda are the chemicals used. These are, therefore, the substances which are to be added to the raw feed-water within the receptacle at a place which is separated from the place where the alkali water is admixed.

In the form illustrated in Figure 1, $c$ is an upright cylindrical receptacle; a vertical partition wall $d^1$ divides this receptacle into two chambers $a^1$ and $b^1$ arranged side by side. The vertical tube S is arranged laterally from said partition-wall in the chamber $b^1$, and the pipe $i$ through which the alkaline water is introduced into the apparatus terminates at the top of the tube S therein. The pipes $f$, $h$, $m$ one for the common soda, one for the caustic soda, and the other for the raw feed-water extend through the side wall of the receptacle and terminate in a small bottomless ante-chamber formed by a wall $r$ being located just above the chamber $a^3$ and of relatively less width than the main chamber $a^1$. The vertical portion or wall $d^1$ extends down into the funnel-shaped member or wall $d^2$ which forms in this case the two chambers $a^3$ and $b^3$. The chambers $a^1$ and $b^1$ are connected with each other at their tops by a short piece of tube $x^1$. Just in front of the entrance-side of this tube is the place where the small amounts of the preliminary purified water is drawn off in order to be tested. The water entering into the tube S here mixes with the alkaline water arriving through the pipe $i$. The purified water leaves the receptacle $c$ through the pipe $p$, through a filtering apparatus, if desired, to the boiler.

In the form shown in Figure 2 the pipe $h$ instead of terminating in the ante-chamber $r$ extends into the tube S. The purpose of this is to add at first only the one chemical such as the caustic soda, the common soda being added later on, together with the alkaline water, so that the amounts of water drawn off in front of the tube $x^1$ in order to be tested shall have been acted on at the time being by only one chemical.

By introducing the raw feed-water and at least one of the chemicals into the ante-chamber formed by the wall $r$ laterally instead of vertically into the chamber $a$, the said chamber constitutes a mixing chamber whereby I obtain a better mixing of the water and chemicals.

What I claim as new is:—

In an apparatus for purifying boiler feed-water, a receptacle, a vertical wall extending upwardly from the bottom substantially the entire height thereof forming two chambers within the receptacle, means for introducing feed-water and a chemical into one of said chambers through the side wall into the lower portion of said chamber, means for introducing another chemical, both means being disposed for the downward delivery of the feed-water and materials, the said receptacle being provided near its lower end with an open-bottomed ante-chamber of relatively less width than that of the main chamber and into which the chemical and feed-water means directly extend.

In testimony whereof I affix my signature.

FERDINAND BLUMENTHAL.